May 12, 1959  C. E. QUISENBERRY  2,886,337
FOLDING CARRIAGE OR STROLLER

Filed April 19, 1956  3 Sheets-Sheet 1

INVENTOR
CARTER E. QUISENBERRY
BY
ATTORNEY

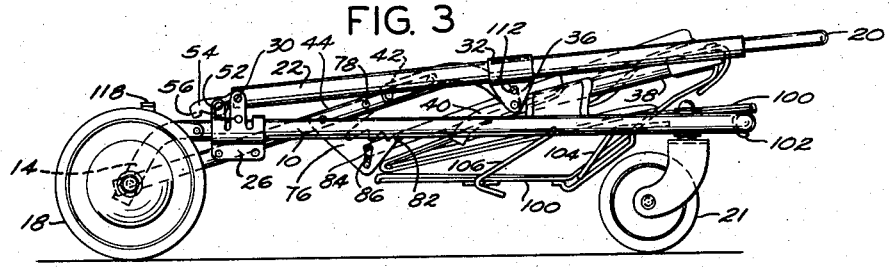

May 12, 1959  C. E. QUISENBERRY  2,886,337
FOLDING CARRIAGE OR STROLLER
Filed April 19, 1956  3 Sheets-Sheet 3

INVENTOR
CARTER E. QUISENBERRY
BY
ATTORNEY

United States Patent Office 2,886,337
Patented May 12, 1959

2,886,337

FOLDING CARRIAGE OR STROLLER

Carter E. Quisenberry, Kirkwood, N.Y., assignor, by mesne assignments, to American Machine & Foundry Company, New York, N.Y., a corporation of New Jersey Application April 19, 1956, Serial No. 579,191

17 Claims. (Cl. 280—36)

This invention relates to folding strollers and carriages.

It is well known that many types of folding strollers and carriages have been constructed in the past. Some have had very complex structural arrangements to facilitate folding while the design of others have met with other objections.

It is the purpose of this invention to provide a folding stroller of rugged construction which is easy to fold, and which will incorporate safety features in its design to prevent the collapse of the stroller when in use.

Another object is to provide an automatic locking device which will prevent a stroller from collapsing.

Another object of this invention is to provide a locking device which can be easily and quickly unlocked by simply pushing the handle downwardly.

A further object of this invention is to provide a folding stroller which can easily be completely collapsed by moving the handle in an arc.

Another object of this invention is to provide a handle which will telescope inside itself to shorten the amount of distance occupied by the handle and to simultaneously employ the telescoping effect to release the locking mechanism.

Another object of this invention is to provide a folding stroller with an improved detachable basket secured to the lower end thereof for supporting packages.

A further object of this invention is to provide an improved simple reliable brake for a stroller or carriage.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 3 is a side view of the stroller in collapsed condition.

Fig. 4 is a detailed cross-sectional side view of the locking mechanism in locked position.

Fig. 5 is a cross sectional detailed side view of the locking mechanism showing it in released position.

Fig. 6 is a top sectional end elevation of the locking mechanism in open position.

Fig. 7 is a cross-sectional side elevation showing the locking mechanism for the telescoping handle.

Fig. 8 is a side elevation showing the brake structure.

Figure 1:
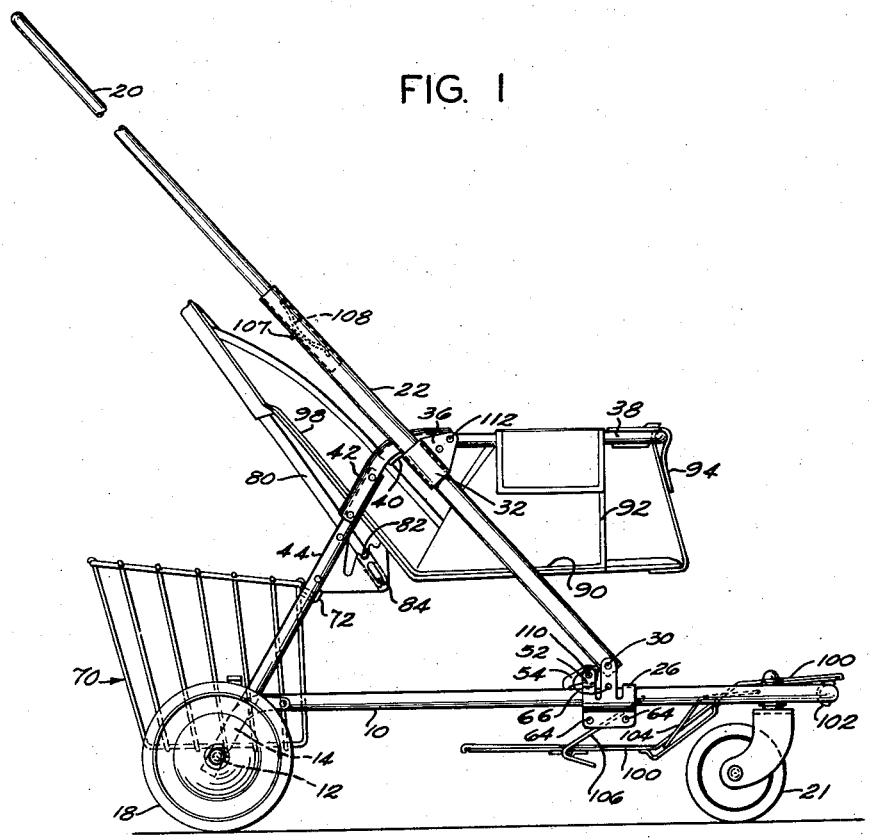
Fig. 1 is a side view of a stroller in raised condition embodying the features of this invention.
Figure 2:
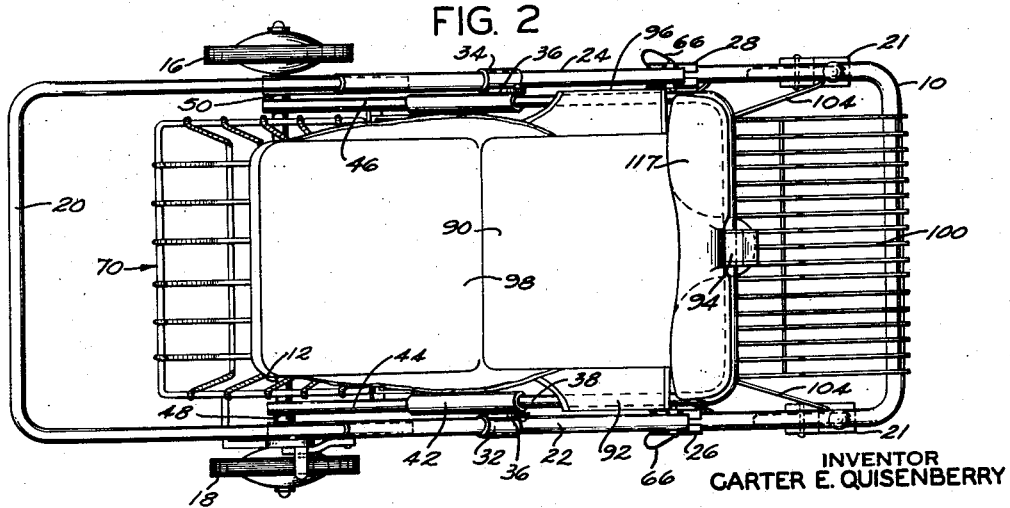
Fig. 2 is a top view of said stroller.

The stroller mechanism consists of a tubular base 10 which is formed in the configuration of a U. The rear end of the legs of the U-shaped member 10 are bent downwardly and have an axle 12 passing through the lower portion of the downwardly bent ends 14 of the U-shaped member 10. The rear wheels 16 and 18 are mounted on the rear axle 12. A pair of swivel wheels 21 are mounted in the front end of the U-shaped base frame member 10.

The collapsible frame structure of the stroller consists of a U-shaped handle 20 the lower ends of which slide into tubings 22 and 24. Tubings 22 and 24 are pivotally connected to sliding shoes 26 and 28, by suitable pivot pins 30. The shoes 26 and 28 are slideably mounted on the U-shaped base 10.

The lower lengths of tubings 22 and 24 have a pair of clamps 32 and 34 fixedly secured thereto. Each of the clamps 32 and 34 has a pair of ears 36 extending therefrom to which is pivotally connected the U-shaped seat frame 38.

The ends 40 of the U-shaped seat frame 38 are curved and conform to the configuration of the curved bracket 42 which is mounted at the upper end of a pair of tubings or legs 44 and 46. The lower ends of the tubings or legs 44 and 46 are pivotally mounted on the rear axle 12 in the same manner as the ends of the U-shaped base tubing 10. The ends of tubing 10 are separated from the ends of tubings or legs 44 and 46 by suitable spacing washers 48 and 50.

Each of the sliding shoes 26 and 28 has an upwardly extending ear 52 to which is pivoted a pawl or bell crank lever 54. One end of the bell crank lever 54 has a claw or tooth 56 which is adapted to fit into hole 58 formed in the tubing 10. The opposite lever or end 60 of the bell crank lever 54 projects through a slot 62 formed in the lower end of the tubings 22 and 24.

The shoes 26 and 28 are maintained in slideable engagement around the tubing 10 by means of suitable rivets 64 which hold each shoe together.

A spring 66 is provided for each locking pawl or bell crank lever 54 so as to urge the tooth 56 up against the tubing 10 so that it will automatically slip in and be maintained in the hole 58 whenever it is in front of that hole. A cross bar 68 separates the tubing 44 and 46 from each other.

Figure 9:
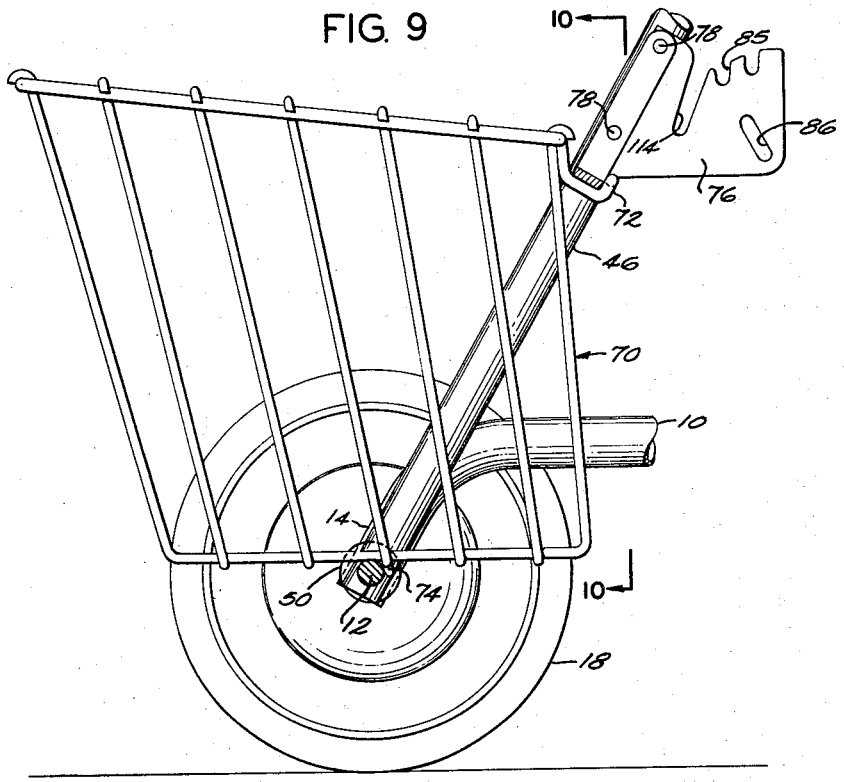
Fig. 9 is a side elevation showing the mounting structure for the carrying basket.
Figure 10:
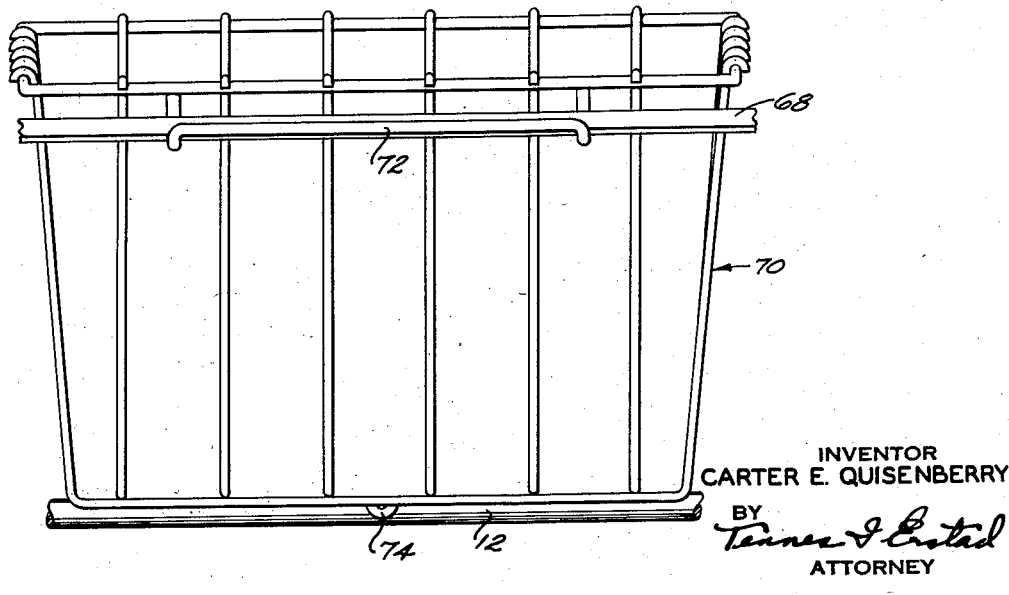
Fig. 10 is an end elevation taken on line 10—10 of Fig. 9.

If desired, a suitable carrying basket 70 such as shown in Figs. 9 and 10 may be attached to the rear end of the stroller. In this instance the basket is shown to have a hook shaped rod 72 which slips underneath the bar 68. The center transverse bottom rod of the basket is provided with a downwardly extending loop 74 shown in Fig. 10 which slips around the forward side of the rear shaft 12. In this way the basket is held securely in place, and rests securely on top of the rear axle 12.

Suitable bayonet-type locking brackets 76 are provided on each of the rear pivoted tubings 44 and 46 for supporting the back rest 80. The brackets are secured to the tubings 44 and 46 by rivets 78. The lower end of the back rest 80 has two extensions 82 and 84 which extend through the slots 85 and 86 respectively. By lifting the back 80 upwardly it will disengage the upper slots 85 and the lower slot 86 permits the lower pin 84 to move upwardly thereby allowing the upper pin 82 to be elevated above the upper slots 85.

The seat 90 of the stroller is supported by suitable hanging straps or fabrics 92, 94, 96 and is pivotally connected to the back rest by fabric padding 98.

A suitable foot rest 100 is provided for the child to place his feet on. The forward end of the foot rest has a hook 102 which slips around the forward end of the U-shaped base tubing 10. A pair of supporting brackets 104 and 106 are hooked into the sides of the U-shaped base tubing 10 and are pivotally secured at their lower ends to the foot rest 100.

The telescoping tubing handle 20 is held in place by means of a suitable spring actuated detent 107, which is urged outwardly by means of a spring 108. A similar detent is mounted in the opposite handle.

The operation of my stroller may be briefly described as follows.

Assuming that the stroller is completely set up as shown in Fig. 1, to disassemble or collapse the stroller, the user of the stroller depresses the detents 107 against springs 108. This disengages the detent from the detent receiving hole 109 formed in the tubing members 22 and 24. When the detent lock has been released in this manner the handle 20 then can be pushed downwardly on the telescoping handle 20 causing it to slide inside tubings 22 and 24. When the lower ends of the tubing 20 reach the bell crank actuating arm 60 as shown in Fig. 5, it swings the bell crank around its pivotal mounting 110 increasing tension on spring 66. This causes the tooth or claw 56 to leave its slot 58. The stroller is now ready to be collapsed.

The party collapsing the stroller then swings the handle 20 and the tubes 22 and 24 around the pivot 112 which causes the shoes 26 and 28 to slide on the tubing base 10 towards the rear axle 12. As the shoes 26 and 28 pass underneath the pivots 112 the stroller commences to collapse, until it assumes the condition shown in Fig. 3.

It can be noted that the distance between pivot point 30 and pivot point 112 is shorter than the distance between pivot point (or axle) 12 and pivot point 112, in order to permit the framework to be collapsed when the lower ends of the front legs 22 and 24 are moved to the rear of base 10.

To facilitate a complete collapse of the stroller, the back seat rest 80 is elevated and then lowered into the last slot 114 which is the same position that is occupied when the child reclines in the stroller when it has been arranged as a bed.

The stroller may be provided with a suitable brake as shown in Fig. 8. This braking structure consists of a link 115 which is pivotally connected by a suitable pivot 116 to the tubing base 10. The opposite end of the link 115 has a brake applying shoe 118 and an actuating pin 120. The actuating pin 120 slides in a pivoted actuating bracket 122 which is pivoted to the base 10 by means of a suitable pivot 124.

The bracket 122 has a foot actuated lever arm 126 extending therefrom on which an individual can step and in so doing cause the bracket 122 to swing about the pivot 124. When this occurs, the slot 128 engages with the pin 120 forcing the pin downwardly, which in turn causes the shoe 118 to move downwardly into contact with the rear wheel 18. To release the brake one merely has to elevate the arm 126, which through the pin 120, lifts the shoe 118 out of contact with the wheel.

When the stroller is set up for use from the collapsed condition shown in Fig. 3, the procedure described is simply reversed. The individual then merely has to grip the U-shaped handle 20, lifting it upwardly. In so doing, the bracket 36 similarly moves upwardly which, in turn, due to its pivotal connection with the seat framework 38, causes the seat framework to rise. As the shoes 26 and 28 slide underneath the pins 112, towards the front end of the stroller, the pins 112 will have attained their maximum elevation and then as the shoes 26 and 28 move forwardly to the front end of the base 10, the supporting seat framework is lowered slightly. As the shoes 26 and 28 move forward the pawls or teeth 56 reach the holes 58 and enter the same, thus locking the stroller in setup condition.

It will be noted, however, the shoes 26 and 28 are rearward of the point at which the wire bracket 106 is engaged with the inside surfaces of the base 10 in Fig. 4. If for any reason the tooth 56 should have failed to engage with the hole 58, the shoe would merely engage with the wire bracket 106 and no harm could come to the child, since the pressure exerted by the weight of the child is down it would, through the pivotal connection 112, urge the shoes 26 and 28 towards the forward end of the base 10 up against the wire bracket 106 where it would come to rest automatically.

By pulling out the handle 20 to its outermost limits, the detent 107 will slip into the hole 109 (Fig. 7) formed in the tubing 22 and 24. It will be noted that when the handle 20 is withdrawn from the tubing 22 and 24 in this manner, the ends thereof disengage with the bell crank lever arms 60 which thus permits the spring 66 to urge the toothed member up against the base 10 so that when it reaches the hole 58 they automatically enter the same.

From the foregoing disclosure it will be evident that I have provided a stroller that is easily collapsed and is just as easily assembled by a single arcuate swing of the handle. It will also be appreciated that the form of construction employed is particularly safe because even if the catch maintaining the stroller in raised condition should collapse or fail to function properly, the inherent design of the stroller assembly is such that it still maintains the carriage in set-up condition, when it is in use and the weight of a child exerts a downward pressure thereon. It will also be noted that the auxiliary basket 70 may be readily attached or detached as desired, so as to allow a mother to carry food as well as her child, as is frequently necessary when she is shopping with her child. If desired, a suitable tray 117 can be secured to the forward end of the seat supporting bracket 38.

The invention herein above described may be varied in construction within the scope of the claims, for the particular device selected to illustrate the invention is but one of many possible embodiments of the same. The invention, therefore, is not to be restricted to the precise details of the structure shown and described.

What is claimed is:

1. A folding carriage or stroller comprising a base, casters for supporting said base, a U-shaped telescoping handle pivotally connected at its lower ends to a pair of shoes slidably mounted on said base, a lock carried on each of said shoes for locking said shoes against movement relative to said base, said lock having an end for causing said lock to be disengaged when said telescoping handle is contracted and actuated against said end, a leg pivotally connected at one end to the rear of the stroller and having a pivotal connection at the opposite end to the sides of said telescoping handle so as to permit said stroller to be collapsed when the shoes are slid towards the rear end of the stroller base.

2. A collapsible carriage or stroller comprising a base having spaced tubing side walls forming the sides of said base, a first pair of spaced tubing members pivotally connected at their lower ends to one end of said base, shoes slidably mounted on said tubing side walls, a second pair of spaced tubing members pivotally connected at their lower ends to said shoes, a supporting bracket fixedly connected to each of the members of the second pair of tubing members at a point spaced from the pivoted lower end thereof, a U-shaped frame member for supporting the seat of the stroller, means for pivotally connecting the legs of said U-shaped frame member to said supporting brackets, means for maintaining said seat frame member free from pivoting on said supporting brackets when the stroller is in its raised position, means allowing said second pair of tubing members to be pivoted about the pivot connection between said supporting bracket and seat frame member to allow said stroller to be collapsed, and means for limiting the distance said shoe members can slide on said tubing side walls for maintaining the stroller in elevated position when moved in one direction and for allowing said shoe members to move in the opposite direction to collapse said stroller.

3. A collapsible stroller or carriage having the features provided for in claim 2 wherein locking means are provided for locking said shoe members against movement relative to said side walls when said stroller has been set up.

4. A collapsible stroller or carriage having the features provided for in claim 3 wherein a collapsible telescoping handle is provided which, upon reaching its position of fullest contraction, causes the said shoe locking means to be released thereby causing said shoes to be permitted to slide relative to said sidewalls.

5. A folding stroller or carriage comprising a U-shaped base, shoes slidably mounted on said base, a pair of spaced arms pivotally connected at one end to said shoes, a bracket fixedly formed at a distance from said pivotal connection on each of said spaced arms, a U-shaped bar pivotally connected to said brackets, and a second pair of arms pivotally connected to the U-shaped bar at their upper ends and being connected at their lower ends to a member substantially adjacent the opposite legs of said U-shaped base.

6. A folding stroller or carriage having the features provided for in claim 5 wherein a lock device is provided on said sliding shoes for fixedly connecting said shoes to said U-shaped base.

7. A folding stroller or carriage having the features provided for in claim 5 wherein means are provided on said U-shaped base for limiting the distance said sliding shoes can move forward on said U-shaped base.

8. A folding stroller or carriage, a base connected at one end to a rear axle, a first pair of spaced arms pivotally connected at one end to said rear axle adjacent the sides of said base, a second pair of arms pivotally connected to the upper ends of said first pair of arms, sliding shoes mounted on the sides of said base, means for pivotally connecting the lower end of said second pair of arms to said sliding shoes, a bracket formed on each of said second pair of arms at a distance spaced from the pivoted connections at the lower ends of said pair of arms, and a second U-shaped bracket for supporting the seat of the child using the stroller or carriage wherein the U-shaped bracket is pivotally connected to the brackets on the second pair of arms.

9. A folding stroller or carriage having the features provided for in claim 8 wherein locks are provided for locking said shoes relative to the sides of said base, a handle telescopically mounted inside the second pair of arms so as to permit the ends of the handle to slide downwardly therein when the stroller is to be collapsed and lock releasing means actuatable by the end of the handle to release said lock.

10. A folding stroller or carriage having the features provided for in claim 9 wherein means are provided for maintaining the handle in locked, outwardly extended position.

11. A folding carriage having a collapsible side frame comprising a pair of spaced rear legs pivotally connected at their lower ends to a base frame, a pair of spaced front legs pivotally interconnected with the upper ends of said rear legs, means for pivotally and slidably connecting the lower ends of said front legs to said base frame for movement back and forth on said frame, and a stop for limiting the distance said sliding means can move forward to maintain said framework in extended condition, the distance between the pivotal connections of the front pair of spaced legs being shorter than the distance between the pivotal connections of the rear spaced legs to permit the framework to be collapsed when the lower ends of the front legs are moved to the rear of said base.

12. A folding stroller or carriage having an undercarriage, a collapsible framework connected to said undercarriage comprising a pair of spaced rear legs pivotally connected at their lower ends to the rear end of said undercarriage, a pair of spaced front legs pivotally interconnected with the upper ends of the rear legs, a pair of spaced shoes slidably mounted on said undercarriage for movement toward the front and rear ends of said undercarriage, means for pivotally connecting the lower ends of said front legs to said sliding members so as to permit the lower ends of said front members either to be moved towards the lower ends of said rear legs to allow the framework to be collapsed or to permit the lower ends of the front legs to be moved towards the front end of said undercarriage so as to permit the framework to be raised.

13. A folding stroller or carriage having the features provided for in claim 12 wherein a telescoping handle extends from the front legs, a lock for securing said shoes against movement relative to said undercarriage when the lower ends of said front legs have been moved towards the front end of said undercarriage and means engageable by the lower ends of said handle when the handle is telescoped inside of said front legs to release said lock to permit said shoes to be moved relative to the undercarriage to permit the framework to be collapsed.

14. A collapsible frame for a stroller or carriage comprising a base having two side rails on opposite sides thereof, a first pair of upwardly extending bars connected at one end to the end of said base, a pair of slidable shoes mounted on said side rails, a second pair of spaced arms pivotally connected at one end to said slidable shoes, means for pivotally interconnecting the opposite ends of said first and second pairs of upwardly extending arms, means for allowing said slide shoes to slide down toward the front end of said base on said rails to permit said upwardly extending side bars to be lowered toward said base to allow said stroller to be folded.

15. A folding stroller or carriage comprising a U-shaped base formed from tubing, a rear axle passing through the ends of said U-shaped tubing, a pair of arms pivotally mounted on said axle adjacent one end of said U-shaped tubing, a second pair of arms pivotally connected to the first pair of arms, shoes pivotally connected to the lower ends of said second pair of arms slidably mounted on the sides of said U-shaped base, and means for locking said shoes against movement relative to said U-shaped base when said shoes have been moved to their most forward position with respect to the front end of said U-shaped frame.

16. A collapsible stroller or carriage comprising a base having a pair of tubing sidewalls forming the sides of said base, a pair of tubing members having their lower ends pivotally connected at one end of said base, shoes slidably mounted on the tubing sidewalls with pivotal connection means, front frame members pivotally connected at their lower ends to the shoes by said pivotal connection means, said front frame members extending upwardly to form a handle, interconnection means for pivotally connecting the pair of tubing members with the front frame members so that the stroller may be collapsed when the shoes are moved toward the rear end of the base as the handle is swung about the pivotal interconnection toward the front of said base.

17. A folding stroller or carriage having the features of claim 16 wherein a lock is provided in said sliding shoes to hold the same in fixed position relative to said base.

References Cited in the file of this patent

UNITED STATES PATENTS

| | | |
|---|---|---|
| 2,420,412 | Boudreau | May 13, 1947 |
| 2,545,336 | Binder | Mar. 13, 1951 |
| 2,591,524 | Douglas | Apr. 1, 1952 |
| 2,612,386 | Schutzer | Sept. 30, 1952 |
| 2,616,719 | Heideman | Nov. 4, 1952 |
| 2,646,186 | Russell | July 21, 1953 |
| 2,649,138 | Rechler | Aug. 18, 1953 |
| 2,678,219 | Goodman | May 11, 1954 |
| 2,752,062 | Swingle | June 26, 1956 |
| 2,754,889 | Lovelace | July 17, 1956 |
| 2,770,288 | Peyton | Nov. 13, 1956 |